(12) United States Patent
Kashiwase (10) Patent No.: US 9,066,331 B2
(45) Date of Patent: Jun. 23, 2015

(54) RADIO BASE STATION AND COMMUNICATION CONTROL METHOD

(75) Inventor: Susumu Kashiwase, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 290 days.

(21) Appl. No.: 13/642,787

(22) PCT Filed: Apr. 21, 2011

(86) PCT No.: PCT/JP2011/059843
§ 371 (c)(1),
(2), (4) Date: Oct. 22, 2012

(87) PCT Pub. No.: WO2011/132742
PCT Pub. Date: Oct. 27, 2011

(65) Prior Publication Data
US 2013/0040679 A1    Feb. 14, 2013

(30) Foreign Application Priority Data

Apr. 23, 2010   (JP) ................ 2010-100355

(51) Int. Cl.
*H04M 11/04*    (2006.01)
*H04W 72/00*    (2009.01)
*H04B 7/00*    (2006.01)
*H04W 72/04*    (2009.01)
(Continued)

(52) U.S. Cl.
CPC ............... *H04W 72/04* (2013.01); *H04W 4/22* (2013.01); *H04W 76/007* (2013.01); *H04W 88/08* (2013.01)

(58) Field of Classification Search
CPC ....... H04W 4/22; H04W 72/04; H04W 72/06; H04W 72/10; H04W 72/1247; H04W 72/1252
USPC ........ 455/404.1, 450–453, 509; 370/328–330
See application file for complete search history.

(56) References Cited

U.S. PATENT DOCUMENTS

2004/0179497 A1* 9/2004 Foore et al. ................... 370/335
2008/0248823 A1* 10/2008 Morita .......................... 455/509
(Continued)

FOREIGN PATENT DOCUMENTS

JP   2005-184686 A   7/2005
JP   2007-043310 A   2/2007
(Continued)

OTHER PUBLICATIONS

An Office Action; "Notice of Reasons for Rejection," issued by the Japanese Patent Office on Feb. 4, 2014, which corresponds to Japanese Patent Application No. 2010-100355 and is related to U.S. Appl. No. 13/642,787; with English language statement of relevance.
(Continued)

*Primary Examiner* — Simon Nguyen
(74) *Attorney, Agent, or Firm* — Studebaker & Brackett PC (57) ABSTRACT

An LTE base station 10-1 reserves uplink resource blocks for urgent communications and downlink resource blocks for urgent communications, when ETWS information is transmitted from a core network 30 to mobile terminals 40. The LTE base station 10-1 releases the uplink resource blocks for urgent communications and the downlink resource blocks for urgent communications when a predetermined time elapsed from the reservation of them and when an amount of calls between the LTE base station 10-1 and the mobile terminals 40 is at or below a fourth predetermined value.

13 Claims, 6 Drawing Sheets

(51) Int. Cl.
*H04W 4/22* (2009.01)
*H04W 76/00* (2009.01)
*H04W 88/08* (2009.01)

(56) References Cited

U.S. PATENT DOCUMENTS

| | | | |
|---|---|---|---|
| 2009/0143046 A1* | 6/2009 | Smith | 455/404.1 |
| 2010/0118719 A1* | 5/2010 | Ishii et al. | 370/252 |
| 2010/0135205 A1* | 6/2010 | Li et al. | 370/328 |
| 2010/0214996 A1* | 8/2010 | Santhanam et al. | 370/329 |
| 2010/0254263 A1* | 10/2010 | Chen et al. | 370/232 |
| 2011/0009100 A1* | 1/2011 | Oyane et al. | 455/414.1 |
| 2011/0151885 A1* | 6/2011 | Buyukkoc et al. | 455/452.1 |
| 2012/0140669 A1* | 6/2012 | Wang et al. | 370/252 |

FOREIGN PATENT DOCUMENTS

| | | |
|---|---|---|
| JP | 2007-89001 A | 4/2007 |
| JP | 2008-085621 A | 4/2008 |
| JP | 2009-230203 A | 10/2009 |
| JP | 2010-166494 A | 7/2010 |

OTHER PUBLICATIONS

3GPP TS 36.413 V8.7.0 (Sep. 2009); 3rd Generation Partnership Project; Technical Specification Group Radio Access Network; Evolved Universal Terrestrial Radio Access Network (E-UTRAN); S1 Application Protocol (S1AP)(Release 8).
International Search Report; PCT/JP2011/059843; Jun. 7, 2011.

* cited by examiner

RADIO BASE STATION AND COMMUNICATION CONTROL METHOD

TECHNICAL FIELD

The present invention relates to a radio base station configured to transmit information from an upper-layer network to mobile terminals to which radio resources are assigned, and also to a communication control method employed in the radio base station.

BACKGROUND ART

Many countries have a legal obligation to alarm the public in case of an emergency event. Examples of the emergency event include natural disasters such as an earthquake, a heavy thunderstorm, and a volcano eruption, industrial disasters such as an explosion at a nuclear facility or a chemical facility, and a terrorist attack or war.

Conventionally, the public is notified of such emergency event by a radio broadcast or a television broadcast. However, a broadcast receiver is usually a stationary device in the house or a semi-stationary device such as a car radio. Not having the stationary or semi-stationary device all the time, the users might fail to obtain emergency information promptly.

In consideration of such a problem, 3GPP (Third Generation Partnership Project) specifies an earthquake and tsunami warning system (ETWS) which is one of the public warning systems (PWS) in a radio communication system supporting LTE (Long Term Evolution), the specifications of which are currently being created. The ETWS is a system configured to transmit emergency information on an earthquake or tsunami to mobile terminals as fast as possible by using a broadcast channel of the radio communication system (see, for example, Non-patent Literature 1).

CITATION LIST

Non-Patent Literature

Non-patent Literature 1: 3GPP TS 36.413 V8.7.0 (2009-09)

SUMMARY OF THE INVENTION

Upon occurrence of an emergency event such as an earthquake or tsunami, communications made for safety confirmation and the like are expected to rapidly increase immediately after the occurrence of the emergency event, causing a radio communication system to face a drastic traffic increase. For this reason, urgent communications to the police, the fire department, and the emergency medical assistance may be difficult to make.

In this respect, an objective of the present invention is to provide a radio base station and a communication control method preventing the certain communication from being difficult to make when the traffic increases.

The present invention has the following features to solve the problem described above. A first feature of the present invention is summarized as follows. A radio base station (LTE base station 10-1) configured to transmit information (ETWS information) from an upper-layer network (core network 30) to mobile terminals (mobile terminals 40) to which radio resources are assigned, comprises: a radio resource reservation unit (radio resource reservation unit 158) configured to reserve a predetermined radio resource for certain communication when a condition for predicting that an amount of traffic between the radio base station and the mobile terminals reaches or exceeds a first predetermined value is satisfied.

The radio base station configured as above reserves predetermined radio resources for certain communication upon satisfaction of a condition for predicting an increase in the amount of traffic between the radio base station and the mobile terminals. Accordingly, it can be prevented that the certain communication is difficult to make when the traffic increases.

A second feature of the present invention is summarized as follows. The information from the upper-layer network is emergency information on a predefined emergency event, and when the emergency information is transmitted to the mobile terminals, the radio resource reservation unit reserves the predetermined radio resource.

A third feature of the present invention is summarized as follows. The radio resource reservation unit reserves the predetermined radio resource by reducing the radio resources assigned to the mobile terminals communicating at a data transmission speed at or above a third predetermined value.

A fourth feature of the present invention is summarized as follows. The radio resource reservation unit reduces, by a predetermined percentage, the radio resource assigned to the mobile terminals communicating at a data transmission speed at or above the third predetermined value.

A fifth feature of the present invention is summarized as follows. The radio resource reservation unit reduces, by a predetermined amount, the radio resource assigned to each of the mobile terminals communicating at a data transmission speed at or above the third predetermined value.

A sixth feature of the present invention is summarized as follows. The radio base station further comprises a radio resource releasing unit (radio resource releasing unit 160) configured to release the predetermined radio resources when a condition for predicting that an amount of traffic between the radio base station and the mobile terminals reaches or falls below a second predetermined value is satisfied after the predetermined radio resource is reserved by the radio resource reservation unit.

A seventh feature of the present invention is summarized as follows. The radio resource releasing unit releases the predetermined radio resources when an amount of calls between the radio base station and the mobile terminals is at or below a fourth predetermined value.

An eighth feature of the present invention is summarized as follows. The information from the upper-layer network is emergency information on a predetermined emergency event, and the radio base station comprises a detector (acceleration sensor 110) configured to detect the emergency event.

A ninth feature of the present invention is summarized as follows. The radio resource releasing unit releases the predetermined radio resource when the emergency event is not detected by the detector after the emergency information is transmitted to the mobile terminals.

A tenth feature of the present invention is summarized as follows. The radio resource releasing unit releases the predetermined radio resource when a time elapsed from the reservation of the predetermined radio resource by the radio resource reservation unit reaches a predetermined time defined according to a degree of the emergency event detected by the detector.

An eleventh feature of the present invention is summarized as follows. After the emergency information is transmitted to the mobile terminals, the detector makes a cycle of detecting the emergency event shorter than that before the transmission of the emergency information to the mobile terminals.

A twelfth feature of the present invention is summarized as follows. The emergency event is an earthquake, and the detector detects a seismic motion.

A thirteenth feature of the present invention is summarized as follows. A communication control method in a radio base station configured to transmit information from an upper-layer network to mobile terminals to which radio resources are assigned, comprises the step of: reserving a predetermined radio resource for certain communication when a condition for predicting that an amount of traffic between the radio base station and the mobile terminals reaches or exceeds a first predetermined value is satisfied.

A fourteenth feature of the present invention is summarized as follows. The communication control method further comprises: the step of releasing the predetermined radio resource when a condition for predicting that an amount of traffic between the radio base station and the mobile terminals reaches or falls below a second predetermined value is satisfied after the predetermined radio resources are reserved.

The present invention can prevent the certain communication from being difficult to make when the traffic increases.

DESCRIPTION OF THE EMBODIMENTS

Next, embodiments of the present invention will be described with reference to the drawings. Specifically, the embodiments of the present invention will be in sequence of (1) Overall Configuration of the Radio Communication System, (2) Configuration of the LTE base station, (3) Operations of the LTE Base Station, (4) Advantageous Effects, and (5) Other Embodiments. The same or similar reference numerals are applied to the same or similar parts in the description of the drawings in the following embodiments.

(1) Overall Configuration of the Radio Communication System

Figure 1:
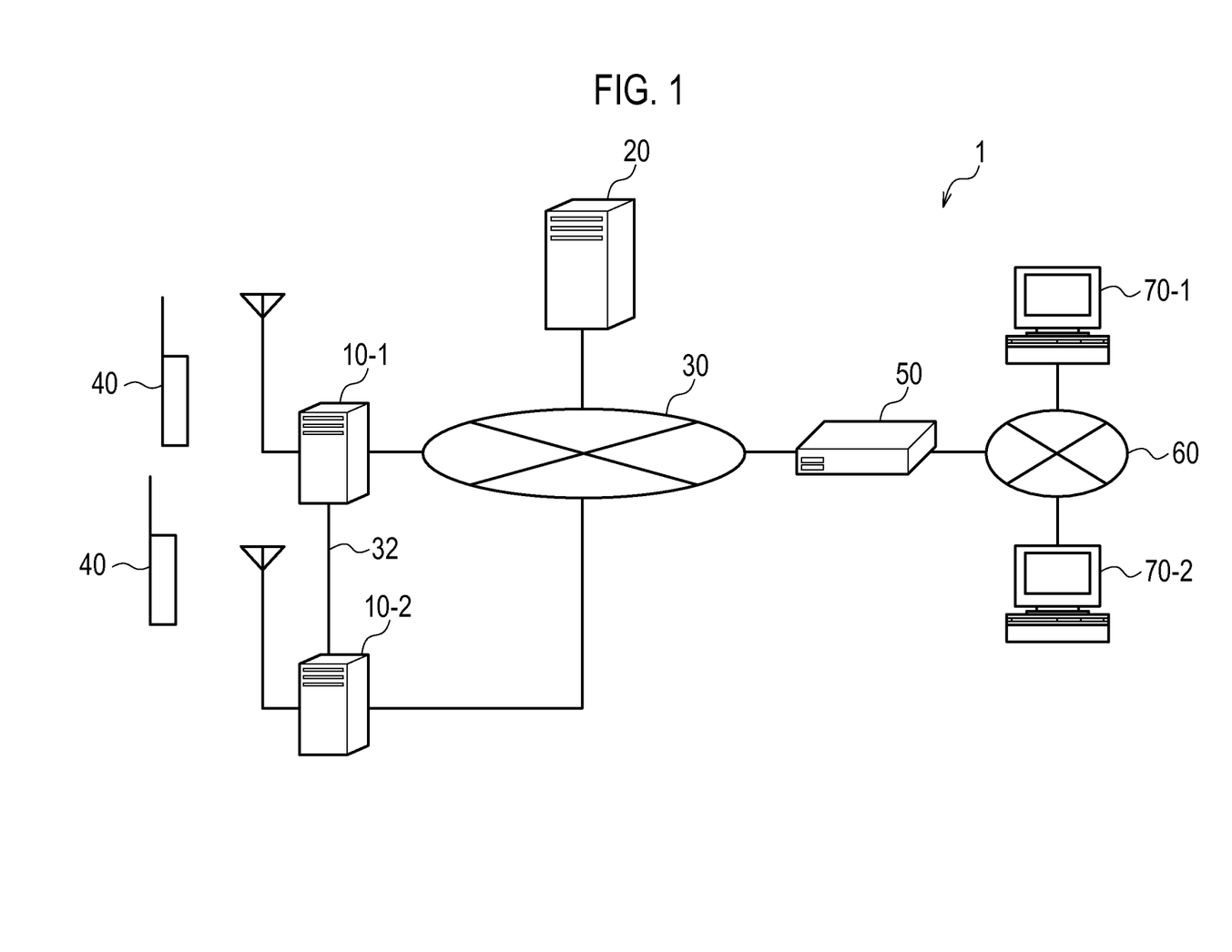
FIG. 1 is a diagram of an overall configuration of a radio communication system according to the present embodiment.

FIG. 1 is a diagram of an overall configuration of a radio communication system according to the present embodiment. In the present embodiment, a radio communication system 1 is configured using the LTE technology. The radio communication system 1 shown in FIG. 1 is configured including an LTE base station 10-1 and an LTE base station 10-2 which correspond to radio base stations, an MME (Mobile Management Entity) 20, a core network 30 which corresponds to an upper-layer network, an optical fiber 32, mobile terminals 40, an earthquake and tsunami warning system (ETWS) information server 50, a public network 60, an ETWS issuing terminal device 70-1, and an ETWS issuing terminal device 70-2.

The LTE base station 10-1, the LTE base station 10-2, the MME 20, and the ETWS information server 50 are connected to the core network 30. The ETWS information server 50, the ETWS issuing terminal device 70-1, and the ETWS issuing terminal device 70-2 are connected to the public network 60. The LTE base station 10-1 and the LTE base station 10-2 are connected to each other with the optical fiber 32.

The mobile terminals 40 perform radio communications with the LTE base station 10-1 and the LTE base station 10-2 via a radio communication zone. In LTE, the communication scheme employed between the mobile terminals 40 and the LTE base station 10-1 and the LTE base station 10-2 is called an evolved UMTS terrestrial radio access network (E-UTRAN).

An S1 interface is established between each of the LTE base station 10-1 and the LTE base station 10-2 and the MME 20 via the core network 30. The S1 interface is a logical transmission path of the transport layer. In addition, an X2 interface can be established between the LTE base station 10-1 and the LTE base station 10-2 via the optical fiber 32. The X2 interface is a logical transmission path of the transport layer.

The ETWS issuing terminal device 70-1 and the ETWS issuing terminal device 70-2 are installed in organizations, such as the government, the police, and the fire department, which are authorized to notify of earth and tsunami warning (ETWS) information which corresponds to emergency information on a predetermined emergency event.

The ETWS issuing terminal device 70-1 and the ETWS issuing terminal device 70-2 notify the mobile terminals 40 of ETWS information in the following procedures.

The ETWS issuing terminal device 70-1 and the ETWS issuing terminal device 70-2 transmit ETWS information to the ETWS information server 50 via the public network 60.

The ETWS information server 50 receives the ETWS information from the public network 60. The ETWS information server 50 then transmits the ETWS information to the MME 20 via the core network 30.

The MME 20 receives the ETWS information from the core network 30. The MME 20 then transmits the ETWS information to the LTE base station 10-1 and the LTE base station 10-2 via the core network 30.

The LTE base station 10-1 and the LTE base station 10-2 receive the ETWS information from the core network 30. The LTE base station 10-1 and the LTE base station 10-2 then transmit the ETWS information to the mobile terminals 40 by broadcast or multicast. Upon receipt of the ETWS information, each mobile terminal 40 provides an emergency service corresponding to the ETWS information (e.g., ringing a predetermined alarm sound) to call user's attention to an earthquake or tsunami.

(2) Configuration of the LTE Base Station

Figure 2:
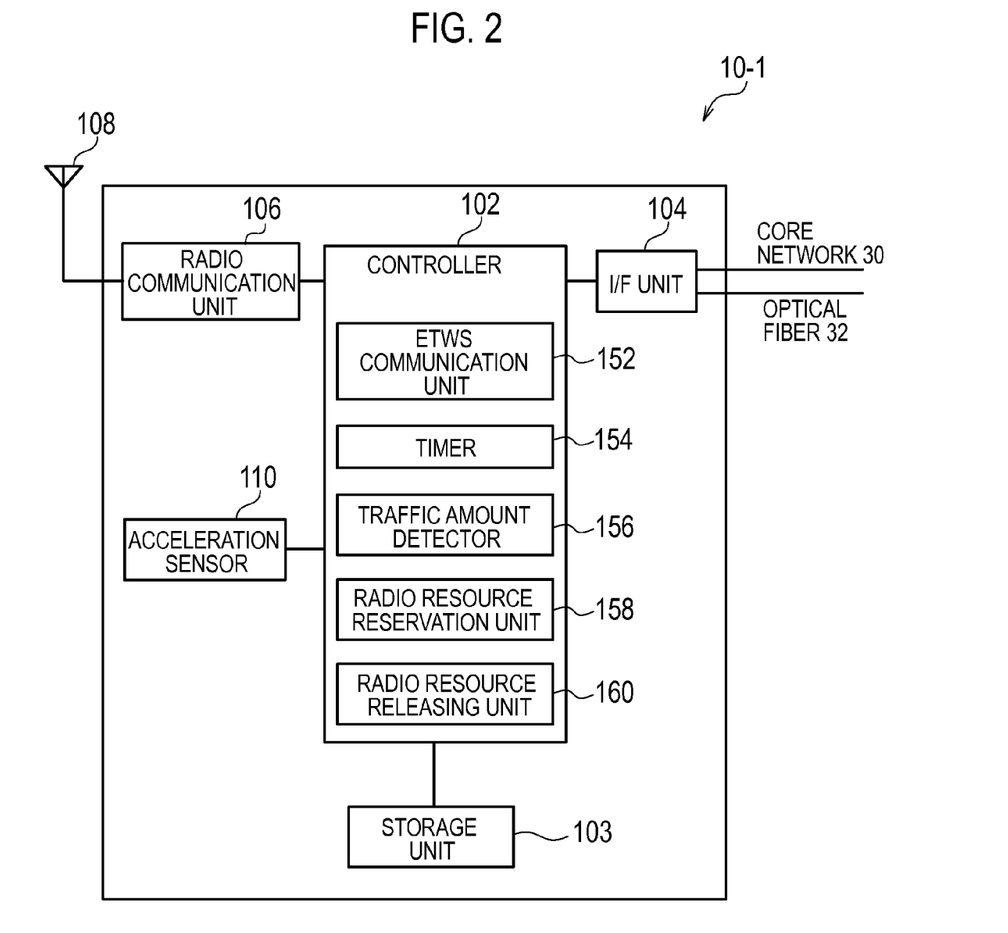
FIG. 2 is a diagram showing the configuration of the LTE base station.

FIG. 2 is a diagram showing the configuration of the LTE base station 10-1. The LTE base station 10-1 shown in FIG. 2 includes a controller 102, a storage unit 103, an I/F unit 104, a radio communication unit 106, an antenna 108, and an acceleration sensor 110. Note that the LTE base station 10-2 has the same configuration as the LTE base station 10-1. In the following description, it is assumed that the mobile terminals 40 are in a cell formed by the LTE base station 10-1.

The controller 102 is configured with, for example, a CPU (central processing unit) and a DSP (digital signal processor), and controls various functions of the LTE base station 10-1. The storage unit 103 is configured with, for example, a memory and stores various pieces of information used for the control of the LTE base station 10-1, or the like.

The I/F unit 104 is connected to the core network 30 and the optical fiber 32. The radio communication unit 106 includes an RF circuit, a baseband circuit, and the like, and performs modulation and demodulation as well as coding and decoding and transmits and receives radio signals to and from the mobile terminals 40 via the antenna 108. The acceleration sensor 110 detects a seismic motion occurring in the LTE base station 10-1.

The controller 102 includes an ETWS communication unit 152, a timer 154, a traffic amount detector 156, a radio resource reservation unit 158, and a radio resource releasing unit 160.

The ETWS communication unit 152 receives ETWS information from the core network 30 via the I/F unit 104. In addition, the ETWS communication unit 152 determines whether or not there are enough available downlink resource blocks for transmitting the ETWS information to the mobile terminals 40. The available downlink resource blocks are available downlink radio resources (unused radio resources).

When there are no enough available downlink resource blocks, the ETWS communication unit 152 reserves downlink resource blocks for ETWS information transmission through downlink scheduling (assignment of radio resources in the direction from the LTE base station 10-1 to the mobile terminals 40).

When there are enough available downlink resource blocks, or when downlink resources blocks for ETWS information transmission are reserved, the ETWS communication unit 152 establishes a communication bearer (a broadcast bearer or a multicast bearer) to each of the mobile terminals 40, and transmits the ETWS information to the mobile terminal 40 via the radio communication unit 106 and the antenna 108.

Further, the ETWS communication unit 152 analyzes the ETWS information to determine the type of emergency event of the ETWS information. The ETWS information contains information indicating the type of emergency event. Here, the type of emergency event is either "earthquake" or "tsunami."

When the ETWS information is transmitted, the ETWS communication unit 152 changes the seismic motion detection cycle of the acceleration sensor 110 from an regular cycle (e.g., one detection per second) to a cycle shorter than the regular cycle (e.g., 30 detections per second).

The timer 154 is activated after the ETWS communication unit 152 transmits the ETWS information. The expiration time of the timer 154 is T1. The expiration time T1 may be changed depending on the type of emergency event of the ETWS information. In this case, the ETWS communication unit 152 makes the expiration time of the timer 154 short when the emergency event type is "earthquake," and makes the expiration time of the timer 154 long when the emergency event type is "tsunami."

The traffic amount detector 156 detects an uplink traffic amount and a downlink traffic amount of each of the mobile terminals 40.

When the ETWS information is transmitted by the ETWS communication unit 152, the radio resource reservation unit 158 predicts that communications for safety confirmation and the like will rapidly increase immediately after the ETWS information transmission and that the total of traffic amounts (a total traffic amount) between the LTE base station 10-1 and all the mobile terminals 40 in the cell formed by the LTE base station 10-1 will reach or exceed a first predetermined value.

Based on this prediction, the radio resource reservation unit 158 reserves uplink resource blocks for urgent communications to the police, the fire department, the emergency medical assistance, and the like, through uplink scheduling (assignment of radio resources in the direction from the mobile terminals 40 to the LTE base station 10-1). The radio resource reservation unit 158 also reserves downlink resource blocks for urgent communication through downlink scheduling.

To be more specific, the radio resource reservation unit 158 acquires an uplink data transmission speed and a downlink data transmission speed of each mobile terminal 40.

Then, the radio resource reservation unit 158 reduces, by a predetermined percentage, the uplink resource blocks assigned to the mobile terminal 40 whose uplink data transmission speed is at or above a first uplink threshold which is a third predetermined value, and reduces, by a predetermined percentage, the downlink resource blocks assigned to the mobile terminal 40 whose downlink data transmission speed is at or above a first downlink threshold which is the third predetermined value. Thereby, the radio resource reservation unit 158 reserves available uplink resource blocks and available downlink resource blocks as uplink resource blocks for urgent communication and downlink resource blocks for urgent communication.

Here, if the number of resource blocks assigned to the mobile terminal 40 is determined according to the data transmission speed of the mobile terminal 40, e.g., if the data transmission speed of the mobile terminal 40 becomes higher with an increase in the number of resource blocks assigned to the mobile terminal 40, the radio resource reservation unit 158 may reduce the resource blocks by a larger percentage for the mobile terminal 40 to which more resource blocks are assigned, or in other words for the mobile terminal 40 having a higher data transmission speed.

Figure 3:
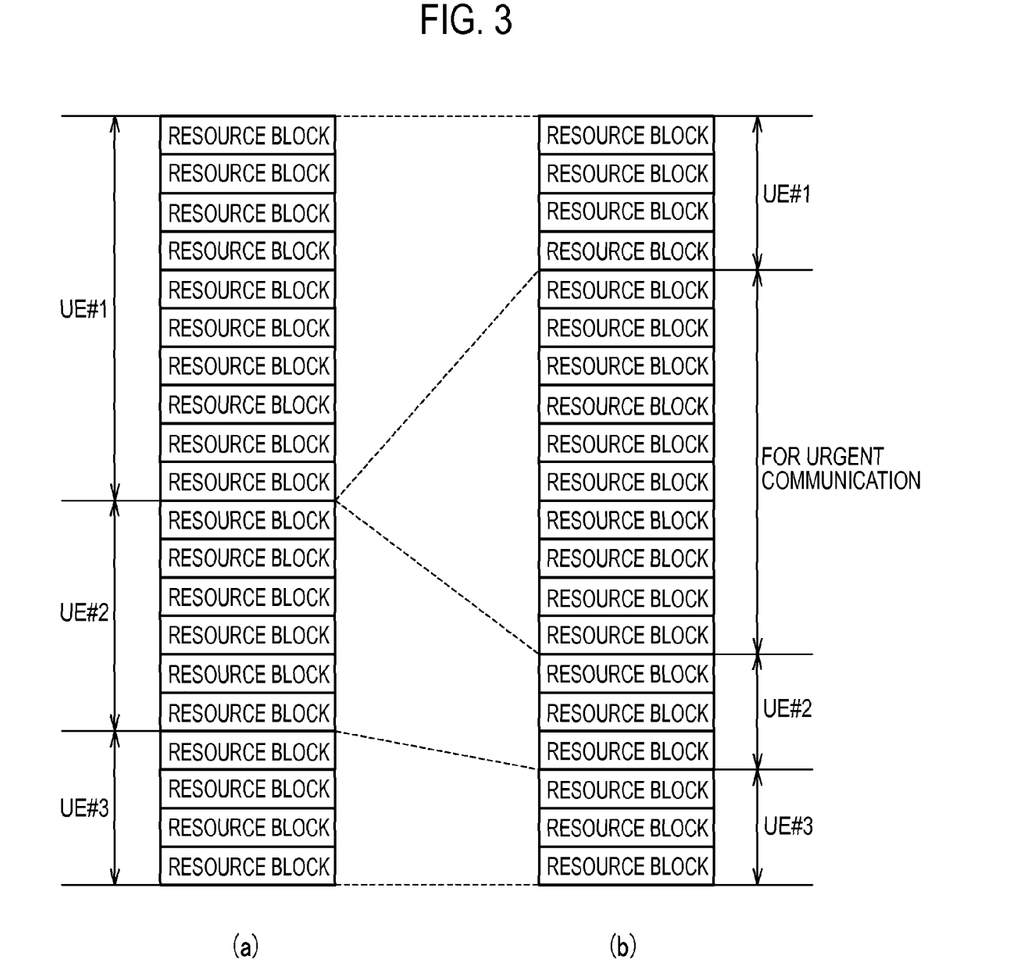
FIG. 3 is a diagram illustrating reservation of resource blocks for urgent information.

FIG. 3 is a diagram illustrating reservation of resource blocks for urgent information. Here, ten resource blocks are needed for the urgent communications. Further, as shown in FIG. 3(a), at first, ten resources blocks, six resource blocks, and four resource blocks are assigned to a mobile terminal UE#1, a mobile terminal UE#2, and a mobile terminal UE#3, respectively.

When the data transmission speeds of the mobile terminal #UE1, the mobile terminal #UE2, and the mobile terminal #UE3 all reach or exceed the third predetermined value, the radio resource reservation unit 158 reduces the resource blocks assigned to the mobile terminal #UE1, the mobile terminal #UE2, and the mobile terminal #UE3 by the predetermined percentage. Specifically, as shown in FIG. 3(b), the radio resource reservation unit 158 reduces the resource blocks assigned to the mobile terminal #UE1 from ten to four, reduces the resource blocks assigned to the mobile terminal #UE2 from six to three, and reduces the resource blocks assigned to the mobile terminal #UE3 from four to three. Thus, ten resource blocks are reserved for the urgent communications.

Alternatively, the radio resource reservation unit 158 reduces, by a predetermined amount, uplink resource blocks assigned to the mobile terminal 40 whose uplink data transmission speed is at or above the first uplink threshold which is the third predetermined value, and reduces, by a predetermined amount, uplink resource blocks assigned to the mobile terminal 40 whose downlink data transmission speed is at or above the first downlink threshold which is the third predetermined value. In this way, the radio resource reservation unit 158 reserves available uplink resource blocks and available downlink resource blocks as uplink resource blocks for urgent communications and downlink resource blocks for urgent communications.

Here, as described above, when the number of resource blocks assigned to the mobile terminal 40 is determined according to the data transmission speed of the mobile terminal 40, the radio resource reservation unit 158 may reduce the resource blocks more from the mobile terminal 40 to which more resource blocks are assigned or in other words from the mobile terminal 40 having a higher data transmission speed.

The radio resource releasing unit 160 releases the uplink resource blocks for urgent communications through uplink scheduling and releases the downlink resource blocks for urgent communications through downlink scheduling when a predetermined condition is satisfied. Specifically, a first releasing procedure and a second releasing procedure below are employed.

In the first releasing procedure, after the radio resource reservation unit 158 reserves the uplink resource blocks for urgent communications and the downlink resource blocks for urgent communications and when the timer 154 expires by a lapse of time T1 from the activation of the timer 154, the radio resource releasing unit 160 acquires an amount of calls between the LTE base station 10-1 and all the mobile terminals 40 in the cell formed by the LTE base station 10-1. Here, the amount of calls is, for example, the total of the number of mobile terminals 40 performing radio communication with the LTE base station 10-1 and the number of mobile terminals 40 requesting the LTE base station 10-1 for a call connection.

The radio resource releasing unit 160 determines whether or not the amount of calls is at or below a fourth predetermined value. When the amount of calls is at or below the fourth predetermined value, the radio resource releasing unit 160 predicts that the total of the amounts of traffic between the LTE base station 10-1 and all the mobile terminals 40 in the cell formed by the LTE base station 10-1 (a total traffic amount) will reach or fall below a second predetermined value. Here, the second predetermined value is a value smaller than the first predetermined value mentioned above.

When the amount of calls is at or below the fourth predetermined value, the radio resource releasing unit 160 releases the uplink resource blocks for urgent communications and the downlink resource blocks for urgent communications reserved by the radio resource reservation unit 158. Moreover, the radio resource releasing unit 160 restores the state of assignment of resource blocks to the mobile terminals 40 to the state before the resource blocks are reserved for the urgent communications.

On the other hand, when the amount of calls exceeds the fourth predetermined value, the radio resource releasing unit 160 does not release the uplink resource blocks for urgent communications or the downlink resource blocks for urgent communications, but reactivates the timer 154, and when the timer 154 expires, repeats the processing of the first releasing procedure.

The second releasing procedure is employed when the type of emergency event of the ETWS information is "earthquake." In the second releasing procedure, after the radio resource reservation unit 158 reserves the uplink resource blocks for urgent communications and the downlink resource blocks for urgent communications, the radio resource releasing unit 160 determines the seismic intensity detected by the acceleration sensor 110. Here, the seismic intensity is categorized into three levels: an intermediate degree which falls within a predetermined range, a large degree which exceeds the predetermined range, and a small degree which is below the predetermined range. Here, the small degree includes a case where no seismic motion is detected by the acceleration sensor 110 because of erroneous issue of ETWS information.

When the seismic intensity is the large degree, the radio resource releasing unit 160 resets (stops) the timer 154. In addition, the radio resource releasing unit 160 sets the detection cycle of the acceleration sensor 110 back to the regular cycle. In this case, the uplink resource blocks for urgent communications and the downlink resource blocks for urgent communications are still reserved.

When the seismic intensity is the intermediate degree, after the expiration of the timer 154, the radio resource releasing unit 160 releases the uplink resource blocks for urgent communications and the downlink resource blocks for urgent communications reserved by the radio resource reservation unit 158. The radio resource releasing unit 160 restores the state of assignment of resource blocks to the mobile terminals 40 to the state before the resource blocks are reserved for the urgent communications. In addition, the radio resource releasing unit 160 sets the detection cycle of the acceleration sensor 110 back to the regular cycle.

When the seismic intensity is the small degree, the radio resource releasing unit 160 resets (stops) the timer 154. The radio resource releasing unit 160 releases the uplink resource blocks for urgent communications and the downlink resource blocks for urgent communications reserved by the radio resource reservation unit 158. The radio resource releasing unit 160 restores the state of assignment of resource blocks to the mobile terminals 40 to the state before the resource blocks are reserved for the urgent communications. In addition, the radio resource releasing unit 160 sets the detection cycle of the acceleration sensor 110 back to the regular cycle.

(3) Operations of the LTE Base Station

Figure 4:
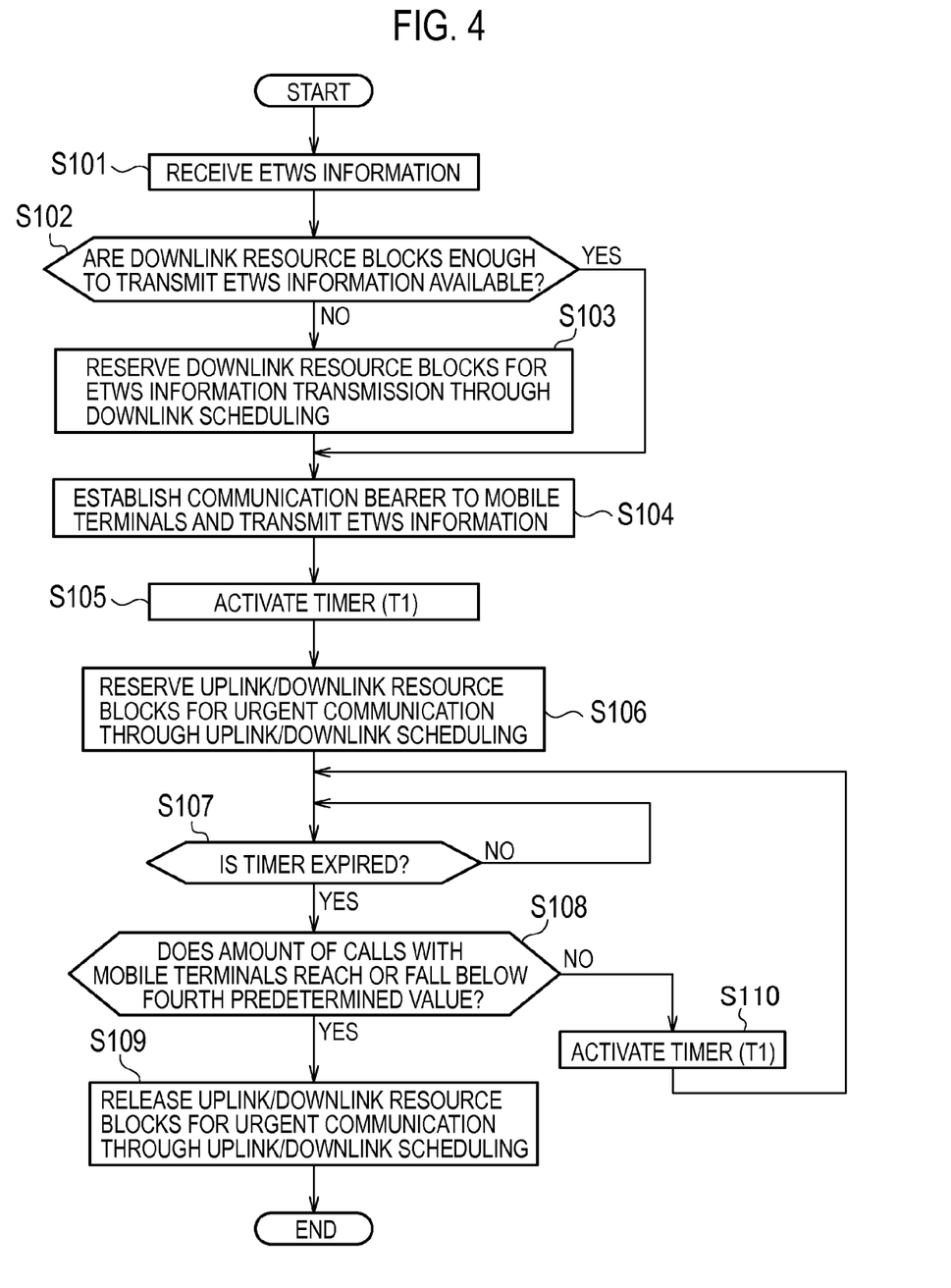
FIG. 4 is a flowchart showing first operations of the LTE base station.

FIG. 4 is a flowchart showing first operations of the LTE base station 10-1. The operations shown in FIG. 4 are performed when the radio resource releasing unit 160 carries out the first releasing procedure described earlier.

In Step S101, the LTE base station 10-1 receives ETWS information from the core network 30.

In Step S102, the LTE base station 10-1 determines whether or not there are enough available downlink resource blocks, which are enough available downlink radio resources, for transmitting the ETWS information to the mobile terminals 40.

When there are no enough available downlink resource blocks, in Step S103 the LTE base station 10-1 reserves downlink resource blocks for transmitting the ETWS information through downlink scheduling.

When it is determined that there are enough available downlink resource blocks in Step S102, or when the downlink resource blocks for transmitting the ETWS information are reserved in Step S103, in Step S104 the LTE base station 10-1 establishes a communication bearer (a broadcast bearer or a multicast bearer) to each of the mobile terminals 40 and transmits the ETWS information to the mobile terminals 40.

In Step S105, the timer 154 in the LTE base station 10-1 is activated.

In Step S106, when the ETWS information is transmitted, the LIE base station 10-1 predicts that the total traffic amount will reach or exceed the first predetermined value, and reserves the uplink resource blocks for urgent communications through uplink scheduling and downlink resource blocks for urgent communications through downlink scheduling.

In Step S107, the LTE base station 10-1 determines whether or not the timer 154 is expired.

When the timer 154 is expired, in Step S108 the LTE base station 10-1 determines whether or not the amount of calls between the LTE base station 10-1 and all of the mobile terminals 40 in the cell formed by the LTE base station 10-1 is at or below the fourth predetermined value.

When the amount of calls is at or below the fourth predetermined value, in Step S109 the LTE base station 10-1 releases the uplink resource blocks for urgent communications and the downlink resource blocks for urgent communications.

On the other hand, when the amount of calls exceeds the fourth predetermined value, in Step S110 the timer 154 in the LTE base station 10-1 is reactivated. Thereafter, the operations from the determination in Step S107 of whether the timer 154 is expired or not are repeated.

Figure 5:
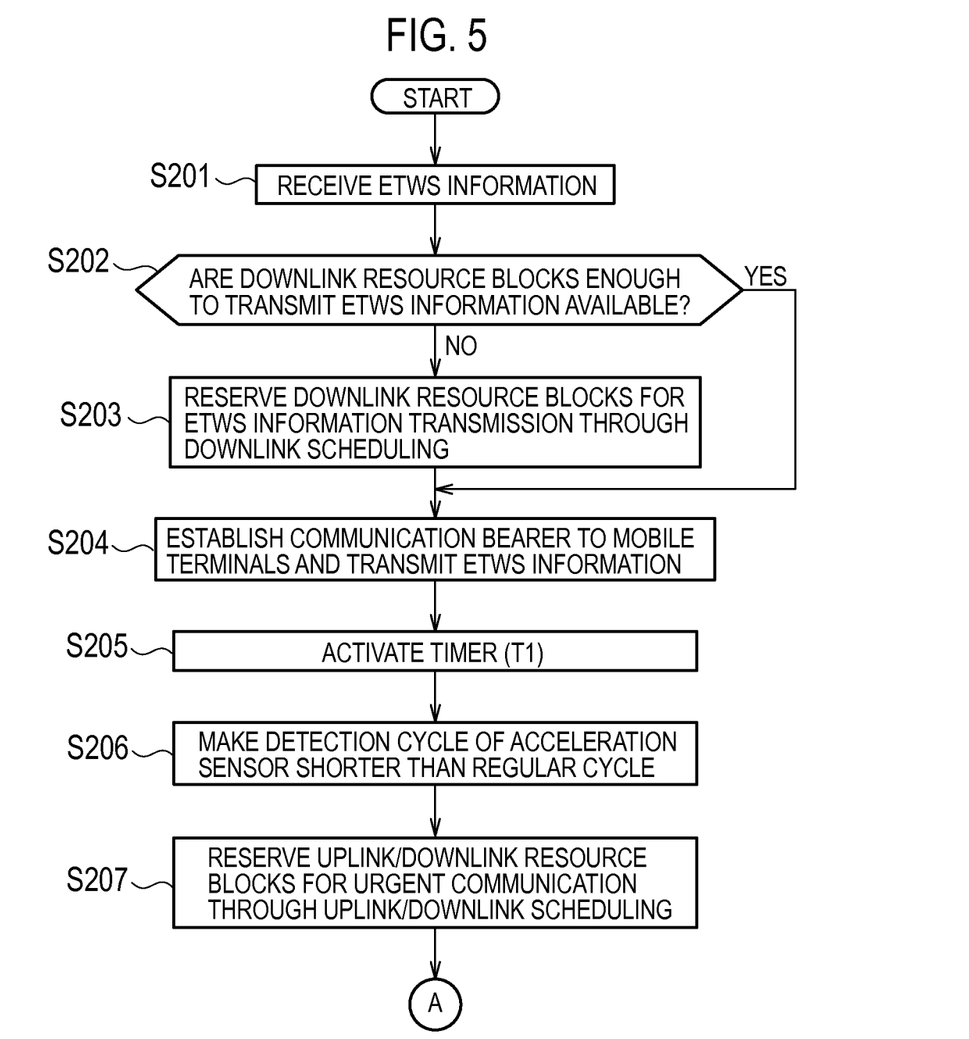
FIG. 5 is a flowchart showing second operations of the LTE base station.
Figure 6:
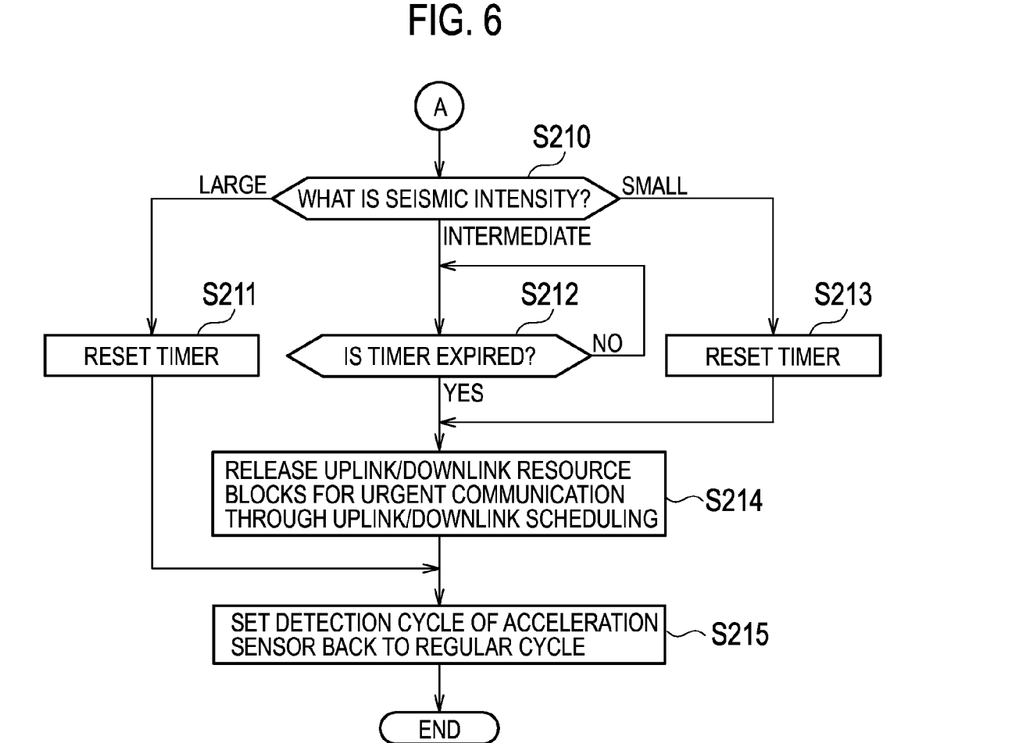
FIG. 6 is a flowchart showing third operations of the LTE base station.

FIGS. 5 and 6 are flowcharts showing second operations and third operations of the LTE base station 10-1, respectively. The operations shown in FIGS. 5 and 6 are performed when the radio resource releasing unit 160 carries out the second releasing procedure described earlier.

The operations in Steps S201 to S205 are the same as those in Steps S101 to S105 in FIG. 4, and therefore are not described here.

In Step S206, the LTE base station 10-1 makes the detection cycle of the acceleration sensor 110 in the LTE base station 10-1 shorter than the regular cycle.

In Step S207, when the ETWS information is transmitted, the LTE base station 10-1 predicts that the total traffic amount will reach or exceed the first predetermined value, and reserves the uplink resource blocks for urgent communications through uplink scheduling and downlink resource blocks for urgent communications through downlink scheduling.

Thereafter, the processing proceeds to the operations shown in FIG. 6. In Step 210, the LTE base station 10-1 determines the seismic intensity detected by the acceleration sensor 110.

When the seismic intensity is the large degree, in Step S211 the LTE base station 10-1 resets (stops) the timer 154. Then, In Step S215, the LTE base station 10-1 sets the detection cycle of the acceleration sensor 110 back to the regular cycle.

When the seismic intensity is the intermediate degree, in Step S212 the LTE base station 10-1 determines whether or not the timer 154 is expired.

When the timer 154 is expired, in Step S214 the LTE base station 10-1 releases the uplink resource blocks for urgent communications and the downlink resource blocks for urgent communications. Then, in Step S215, the LTE base station 10-1 sets the detection cycle of the acceleration sensor 110 back to the regular cycle.

When the seismic intensity is the small degree, in Step S213 the LTE base station 10-1 resets (stops) the timer 154. Then, in Step S214, the LTE base station 10-1 releases the uplink resource blocks for urgent communications and the downlink resource blocks for urgent communications. In Step S215, the LTE base station 10-1 sets the detection cycle of the acceleration sensor 110 back to the regular cycle.

(4) Advantageous Effects

In the radio communication system 1 according to the embodiment of the present invention, when ETWS information is transmitted from the core network 30 to the mobile terminals 40, the LTE base station 10-1 judges that a condition for predicting that the amount of traffic between the LTE base station 10-1 and the mobile terminals 40 will reach or exceed the first predetermined value is satisfied, and reserves the uplink resource blocks for urgent communications and the downlink resource blocks for urgent communications. Accordingly, even when traffic increases, it can be prevented that urgent communications are difficult to make.

When a predetermined time period has passed since the reservation of the uplink resource blocks for urgent communications and the downlink resource blocks for urgent communications and when the amount of calls between the LTE base station 10-1 and the mobile terminals 40 is at or below the fourth predetermined value, the LTE base station 10-1 judges that a condition for predicting that the amount of traffic between the LTE base station 10-1 and the mobile terminals 40 will reach or fall below the second predetermined value is satisfied, and releases the uplink resource blocks for urgent communications and the downlink resource blocks for urgent communications.

Further, when the type of emergency event indicated by the ETWS information is "earthquake" and when the seismic intensity is the large degree, the LTE base station 10-1 judges that a condition is not satisfied for predicting a decrease in the amount of traffic between the LTE base station 10-1 and the mobile terminals 40, and continues to reserve the uplink resource blocks for urgent communications and the downlink resource blocks for urgent communications. When the seismic intensity is the intermediate degree, the LTE base station 10-1 judges, after the expiration of the timer 154, that the condition for predicting a decrease in the amount of traffic between the LTE base station 10-1 and the mobile terminals 40 is satisfied, and releases the uplink resource blocks for urgent communications and the downlink resource blocks for urgent communications. Further, when the seismic intensity is the small degree, the LTE base station 10-1 judges, without waiting for the timer 154 to expire, that the condition for predicting a decrease in the amount of traffic between the LTE base station 10-1 and the mobile terminals 40 is satisfied, and releases the uplink resource blocks for urgent communications and the downlink resource blocks for urgent communications.

This can prevent a situation where resource blocks are difficult to reserve for communications other than the urgent communications when the uplink resource blocks for urgent communications and the downlink resource blocks for urgent communications are continuously reserved even after the amount of traffic between the LTE base station 10-1 and the mobile terminals 40 decreases, or in other words, even after the increase in the traffic amount due to the emergency event is resolved.

(5) Other Embodiments

As described above, the present invention has been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the embodiment described above, the LTE base station 10-1 transmits the ETWS information from the core network 30 to the mobile terminals 40. The present invention is also applicable to a case where the LTE base station 10-1 receives emergency information related to an emergency event predefined in the PWS other than the ETWS and transmits the emergency information to the mobile terminals 40.

In the embodiment described above, the prediction that the total traffic amount will reach or exceed the first predetermined value is made triggered by transmission of ETWS information, and radio resources for urgent communication are reserved. Alternatively, the radio resources for urgent communications may be reserved when prediction that the total traffic amount will reach or exceed the first predetermined value is made when coming to a time during which a traffic amount is predicted to increase, such as right after the turn of the year, when a particular event during which a traffic amount is predicted to increase takes place, or the like.

The radio resources for urgent communications may be released when prediction that the total traffic amount will reach or fall below the second predetermined value is made after the elapse of the time during which a traffic amount is predicted to increase, or after the end of the particular event during which a traffic amount is predicted to increase.

In the embodiment described above, when ETWS information is transmitted from the core network 30 to the mobile terminals 40, the LTE base station 10-1 judges that the condition for predicting that the amount of traffic between the LTE base station 10-1 and the mobile terminals 40 will reach or exceed the first predetermined value is satisfied. Alternatively, triggered by receipt of the ETWS information, the LTE base station 10-1 may judge that the condition for predicting that the amount of traffic between the LTE base station 10-1 and the mobile terminals 40 will reach or exceed the first predetermined value is satisfied.

The radio communication system 1 employs LTE in the embodiment described above, but the present invention is also applicable to any radio communication system configured to reserve radio resources for predetermined communications such as urgent communications.

Although the acceleration sensor 110 is used for detection of an earthquake which is one of the emergency events, a different detector may be used according to the type of emergency event. For example, when the type of emergency is tsunami, a tide gauge is used.

It should be understood that the present invention includes various embodiments which are not described herein. Accordingly, the present invention is only limited by the scope of the claims and matters specifying the invention, which are appropriate from this disclosure.

Note that the entire content of Japanese Patent Application No. 2010-100355 (filed on Apr. 23, 2010) is incorporated in the present specification by reference.

INDUSTRIAL APPLICABILITY

The radio base station and the communication control method of the present invention are applicable to a radio base station and a communication control method, by which it is possible to prevent a certain communication from being difficult to make when the traffic increases.

The invention claimed is:

1. A radio base station configured to transmit information from an upper-layer network to mobile terminals to which radio resources are assigned, comprising:
   a radio resource reservation unit configured to reserve a predetermined radio resource for certain communication when a condition for predicting that an amount of traffic between the radio base station and the mobile terminals reaches or exceeds a first predetermined value is satisfied, wherein
   the radio resource reservation unit reserves the predetermined radio resource by reducing the radio resources assigned to the mobile terminals communicating at a data transmission speed at or above a third predetermined value.

2. The radio base station according to claim 1, wherein the information from the upper-layer network is emergency information on a predefined emergency event, and when the emergency information is transmitted to the mobile terminals, the radio resource reservation unit reserves the predetermined radio resource.

3. The radio base station according to claim 1, wherein the radio resource reservation unit reduces, by a predetermined percentage, the radio resource assigned to the mobile terminals communicating at a data transmission speed at or above the third predetermined value.

4. The radio base station according to claim 1, wherein the radio resource reservation unit reduces, by a predetermined amount, the radio resource assigned to each of the mobile terminals communicating at a data transmission speed at or above the third predetermined value.

5. A radio base station configured to transmit information from an upper-layer network to mobile terminals to which radio resources are assigned, comprising:
   a radio resource reservation unit configured to reserve a predetermined radio resource for certain communication when a condition for predicting that an amount of traffic between the radio base station and the mobile terminals reaches or exceeds a first predetermined value is satisfied, and
   a radio resource releasing unit configured to release the predetermined radio resources when a condition for predicting that an amount of traffic between the radio base station and the mobile terminals reaches or falls below a second predetermined value is satisfied after the predetermined radio resource is reserved by the radio resource reservation unit.

6. The radio base station according to claim 5, wherein the radio resource releasing unit releases the predetermined radio resources when an amount of calls between the radio base station and the mobile terminals is at or below a fourth predetermined value.

7. The radio base station according to claim 5, wherein the information from the upper-layer network is emergency information on a predetermined emergency event, and
   the radio base station comprises a detector configured to detect the emergency event.

8. The radio base station according to claim 7, wherein the radio resource releasing unit releases the predetermined radio resource when the emergency event is not detected by the detector after the emergency information is transmitted to the mobile terminals.

9. The radio base station according to claim 7, wherein the radio resource releasing unit releases the predetermined radio resource when a time elapsed from the reservation of the predetermined radio resource by the radio resource reservation unit reaches a predetermined time defined according to a degree of the emergency event detected by the detector.

10. The radio base station according to claim 7, wherein after the emergency information is transmitted to the mobile terminals, the detector makes a cycle of detecting the emergency event shorter than that before the transmission of the emergency information to the mobile terminals.

11. The radio base station according to claim 7, wherein the emergency event is an earthquake, and
   the detector detects a seismic motion.

12. The radio base station according to claim 5, wherein the information from the upper-layer network is emergency information on a predefined emergency event, and when the emergency information is transmitted to the mobile terminals, the radio resource reservation unit reserves the predetermined radio resource.

13. A communication control method in a radio base station configured to transmit information from an upper-layer network to mobile terminals to which radio resources are assigned, comprising the steps of:

reserving a predetermined radio resource for certain communication when a condition for predicting that an amount of traffic between the radio base station and the mobile terminals reaches or exceeds a first predetermined value is satisfied; and releasing the predetermined radio resource when a condition for predicting that an amount of traffic between the radio base station and the mobile terminals reaches or falls below a second predetermined value is satisfied after the predetermined radio resources are reserved.

* * * * *